United States Patent [19]
Ulmet et al.

[11] Patent Number: 5,921,080
[45] Date of Patent: Jul. 13, 1999

[54] OXIDATION CATALYTIC CONVERTER SYSTEM FOR SMALL SPARK IGNITED ENGINES

[75] Inventors: Vlad Ulmet, Toronto, Canada; William J. Southgate, Farnborough, United Kingdom

[73] Assignee: The Lubrizol Corporation, Wickliffe, Ohio

[21] Appl. No.: 08/813,475

[22] Filed: Mar. 7, 1997

[51] Int. Cl.$^6$ ........................................ F01N 3/00
[52] U.S. Cl. ............................ 60/308; 60/302; 60/322
[58] Field of Search .................... 60/308, 322, 302; 422/176

[56] References Cited

U.S. PATENT DOCUMENTS

| | | | |
|---|---|---|---|
| 3,050,376 | 8/1962 | Bishop et al. | 60/308 |
| 3,066,477 | 12/1962 | Houdry | 60/308 |
| 3,741,730 | 6/1973 | Alcott | 60/308 |
| 4,339,919 | 7/1982 | Jobling et al. | 60/322 |
| 5,234,672 | 8/1993 | Ruscheweyh | 422/176 |
| 5,421,154 | 6/1995 | Pfefferle et al. | 60/308 |

FOREIGN PATENT DOCUMENTS

| | | | |
|---|---|---|---|
| 52-44323 | 4/1977 | Japan | 60/308 |
| 52-53121 | 4/1977 | Japan | 60/308 |
| 52-70222 | 6/1977 | Japan | 60/308 |
| 52-70223 | 6/1977 | Japan | 60/308 |

*Primary Examiner*—Thomas E. Denion
*Attorney, Agent, or Firm*—Renner, Otto, Boisselle & Sklar, P.L.L.

[57] ABSTRACT

An oxidation catalytic converter system for small spark ignited engines includes a housing containing a catalyst, an inlet for receiving exhaust gases from the engine, and an outlet for discharge of the exhaust gases from the housing after passing through the catalyst. Attached to the engine exhaust is a jet pipe that extends into the inlet in noncontacting relation to the housing, whereby the catalytic converter is vibrationally isolated from the jet pipe. Surrounding the jet pipe is an annular air gap through which ambient air is drawn into the housing and mixed with the exhaust gases for enhanced cooling and catalyst performance.

15 Claims, 2 Drawing Sheets

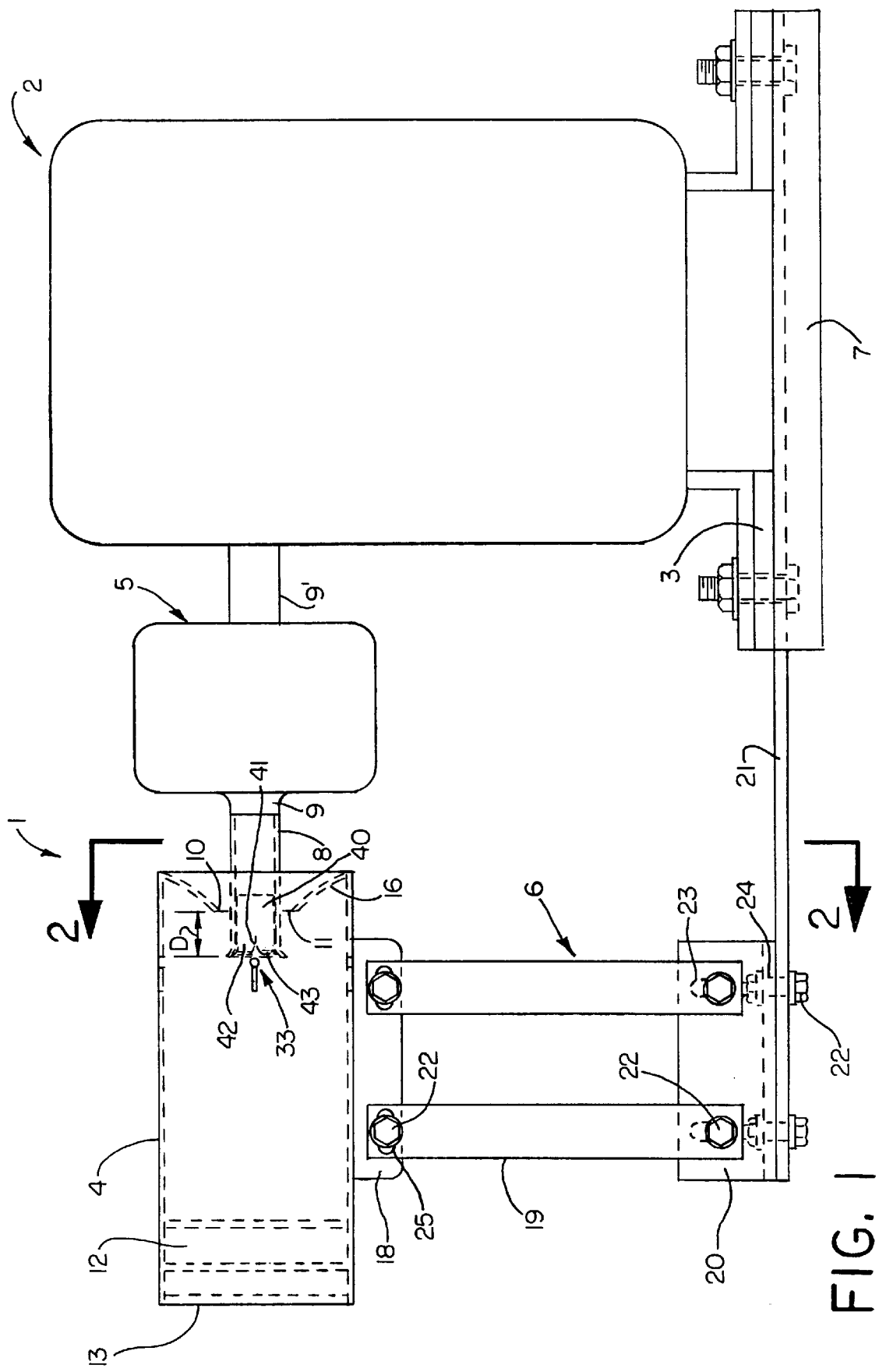

OXIDATION CATALYTIC CONVERTER SYSTEM FOR SMALL SPARK IGNITED ENGINES

FIELD OF THE INVENTION

This invention relates to an oxidation catalytic converter system for small spark ignited internal combustion engines having a power output below approximately 25 horsepower.

BACKGROUND OF THE INVENTION

Industrial spark ignited engines with a power output below approximately 25 horsepower are used as a power source for a wide variety of disposable goods such as go carts, lawn mowers and industrial equipment including generator sets, compressors, pumps, and so on. The raw exhaust emissions from these engines, which are available in one or two cylinder configurations, are extremely high, not only because of poor performance dictated by low cost engineering and manufacturing, but also because of the fundamental necessity of operation with rich air fuel ratios dictated by the use of air cooling instead of water cooling. To illustrate how high the emissions are from these engines, a typical 4 horsepower lawn mower engine for example generates as much carbon monoxide in one hour of operation as an average 1990's automobile engine driven approximately 350 miles.

Conventional application of catalyst technology in the exhaust stream of these engines offers moderate but short lived benefits due to sintering of the precious metal support at the high temperatures of operation. Raw exhaust temperatures of these engines are typically 700 to 800° C., and these temperatures are further increased by the exothermic oxidation reaction.

These engines also produce high vibration levels due to unbalanced inertia forces typical of one or two cylinder configurations, which lead to fatigue cracks on any auxiliary heavy parts attached to the engines and especially exhaust components such as catalyst converter systems because of the high temperatures of operation.

SUMMARY OF THE INVENTION

This invention relates to an oxidation catalytic converter system for small spark ignited engines (e.g., engines having a power output below approximately 25 horsepower) that substantially reduces the sources of mechanical failures caused by the high vibration levels associated with these engines as well as high temperature failures caused by their high exhaust temperatures.

In accordance with one aspect of the invention, the catalytic converter system is mounted so that the catalyst housing is not in physical contact with the vibrating engine whereby the catalyst housing is vibrationally isolated from the engine.

In accordance with another aspect of the invention, the catalytic converter system reduces the exhaust temperature of the engine through ambient air dilution which also insures oxygen availability for a high and sustained oxidation of carbon monoxide and hydrocarbons and enables the system to survive the strong exothermic reaction that occurs for an extended useful life of the system.

In accordance with another aspect of the invention, the catalytic converter system provides for increased mixing of the exhaust gases from the engine with ambient air for enhanced cooling and catalyst performance.

In accordance with another aspect of the invention, the catalytic converter system is capable of being fine tuned to obtain a desired catalytic performance for a given size engine.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a schematic side elevation view of a preferred form of catalytic converter system in accordance with this invention shown mounted to a small spark ignited engine;

DETAILED DESCRIPTION OF THE PREFERRED EMBODIMENT

Figure 4:
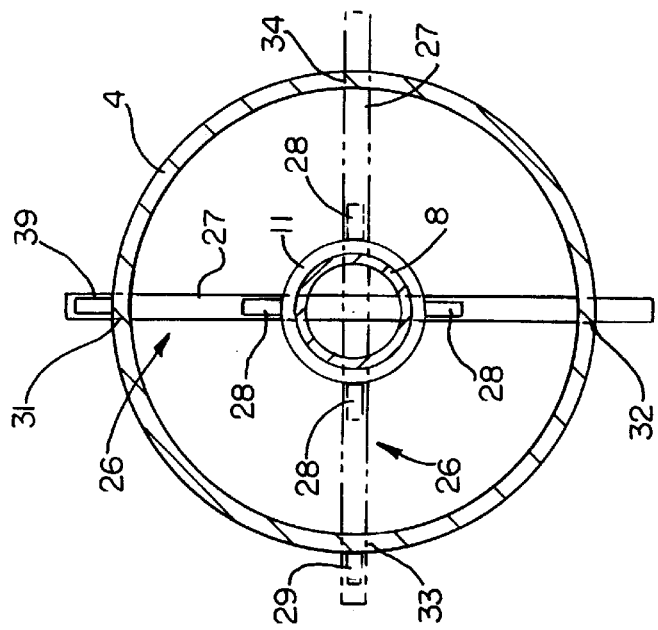
FIG. 4 is a fragmentary vertical section through the catalyst housing and jet pipe of FIG. 3 taken generally along the plane of the line 4—4 thereof to show how good concentricity of the jet pipe within the inlet opening is also established in a second plane perpendicular to the first plane.

Referring now in detail to the drawings, and initially to FIG. 1, a preferred form of catalytic converter system 1 in accordance with this invention is shown mounted to a small spark ignited engine 2 (e.g., an engine having a power output below approximately 25 horsepower). The engine 2 may be of conventional type used as a power source for disposable goods such as go carts, lawn mowers and industrial equipment including generator sets, compressors and pumps and the like. The high vibration levels of such an engine resulting from unbalanced inertia forces typical of one or two cylinder configurations can be significantly reduced by using elastic engine mounts or rubber pads 3 to mount the engine to a chassis 7.

Nevertheless, these vibration levels are still sufficiently high that they could lead to fatigue cracks in the housing 4 of the catalytic converter 1 if the catalyst housing 4 were attached directly to the engine exhaust 5 especially in view of the high temperatures of operation associated therewith. To substantially reduce these mechanical and high temperature failures of catalytic converters associated with engines of this type, the catalyst housing 4 is mounted in such a way that the catalyst housing never touches and is therefore vibrationally isolated from the engine 2.

In accordance with the present invention, this is accomplished by providing a separate mounting bracket 6 for mounting the catalyst housing 4 directly to the engine chassis 7 rather than to the engine 2.

The exhaust gases from the engine 2 are introduced into the catalyst housing 4 by a jet tube or pipe 8. One end of the jet pipe 8 is connected directly to the engine exhaust 5 as by welding such end to the engine muffler discharge 9, or if there is no muffler, to the exhaust pipe 9'. The other end of the jet pipe 8 extends into the inlet opening 10 to the catalyst housing 4 without contacting the catalyst housing.

Contact between the jet pipe 8 and catalyst housing 4 is avoided by making the inlet opening 10 larger than the jet pipe and by substantially concentrically orienting the jet pipe within the inlet opening so that there is an annular gap 11 surrounding the jet pipe at the inlet opening.

Since the annular gap 11 surrounding the jet pipe 8 is exposed to the atmosphere, the flow of exhaust gases through the jet pipe into the catalyst housing 4 will produce a venturi effect causing ambient air to be drawn into the housing through the annular gap where it is mixed with the exhaust gases prior to passing through the catalyst 12 within the housing and discharge through the outlet end 13 of the catalytic converter 1 into the atmosphere. This results in a reduction in the exhaust temperature through ambient air dilution, and also insures the availability of sufficient oxygen for high and sustained oxidation of the CO and HC emissions in the exhaust gases.

Preferably, the insertion depth D of the jet pipe 8 through the inlet opening 10 into the catalyst housing 4 and the size of the annular gap 11 can be preselected for a given size and type of engine 2 to achieve a desired quantity of ambient air dilution to allow for fine tuning of the performance of the catalytic converter 1 in a spectrum ranging from high and sustained oxidation of CO and HC for two-way emissions control to reduction of NOx as well for three-way emissions control. Also, the end wall 16 of the catalyst housing 4 defining the inlet opening 10 is desirably of a generally conical shape to aid in the flow of ambient air into the catalyst housing through the annular gap 11.

Figure 2:
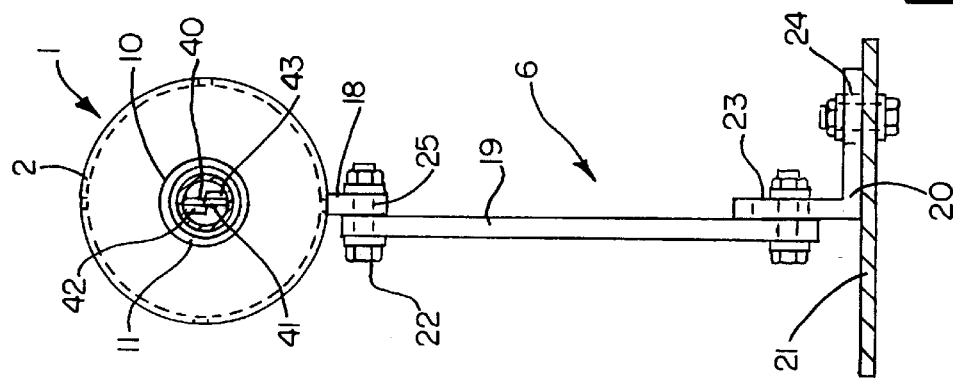
FIG. 2 is a fragmentary vertical section through the jet pipe and mounting bracket for the catalytic converter of FIG. 1 taken generally along the plane of the line 2—2 thereof.

Once the insertion depth D of the jet pipe 8 into the catalyst housing 4 and the annular gap 11 size are established, it is critical to obtaining the desired performance characteristics of the catalytic converter 1 that the established insertion depth and good concentricity of the jet pipe within the inlet opening 10 be realized during installation. This is accomplished in accordance with the present invention by providing the mounting bracket 6 with different bracket members 18–21 (see FIGS. 1 and 2) connected together by bolt assemblies 22 passing through slots for three directional adjustment (e.g., vertical slots 23 for vertical adjustment, transverse slots 24 for lateral adjustment, and axial slots 25 for axial adjustment).

Figure 3:
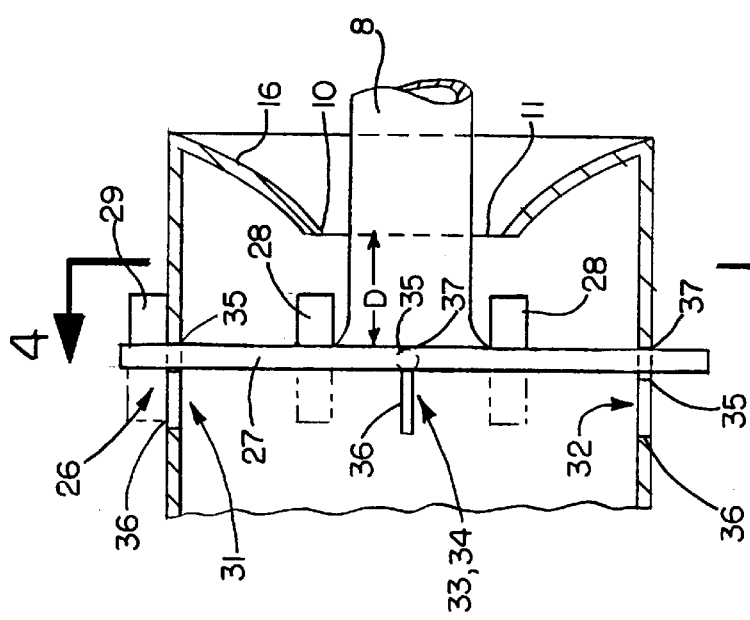
FIG. 3 is an enlarged fragmentary longitudinal section through the catalyst housing of FIG. 1 schematically showing how the insertion depth of the jet pipe into the catalyst housing and good concentricity of the jet pipe within the inlet opening in one plane are established.

If desired, an alignment aid tool 26 may be used to assist in such installation. As shown in FIGS. 3 and 4, the alignment aid tool 26 comprises a rod 27 having two spaced apart centering tabs 28 extending perpendicular therefrom. The centering tabs 28 are spaced apart a distance slightly greater than the outside dimensions of the end of the jet pipe 8 that extends into the catalyst housing 4. Also, a stop tab 29 is provided adjacent one end of the rod 27.

Extending diametrically through opposite sides of the catalyst housing 4 are two pairs of keyhole shaped slots 31, 32 and 33, 34 which are in the same transverse plane but are oriented 90° relative to each other. The slots 31–34 are of a shape substantially corresponding to the shape of the alignment aid tool 26; e.g., each includes a round hole 35 for receiving the round rod 27 and a radial slot portion 36 for receiving the tabs 28 and 29. The radial slot portions 36 are in planes extending 90° or more away from the inlet opening 10. In the embodiment disclosed herein, the slot portion 36 of each keyway slot is shown extending 180° away from inlet opening 10. Also, the forwardmost edge 37 of the round opening 35 of each keyway slot is axially inwardly spaced from the inlet opening 10 by a distance corresponding to the established insertion depth D of the jet pipe 8.

During installation, the alignment aid tool 26 is first inserted through one of the keyway slots 31 of one pair until the leading end of the rod 27 protrudes through the opening 35 of the other keyway slot 32 of that pair and the stop tab 29 is located adjacent the outside wall of the catalyst housing 4 with the two centering tabs 28 facing away from the inlet opening 10 as schematically shown in phantom lines in FIG. 3. Then the tool 26 is rotated 180° so that the centering tabs 28 extend axially toward the inlet opening 10 as shown in solid lines in FIG. 3. Next the position of the catalyst housing 4 is adjusted in three different planes (e.g., vertically, laterally and axially) by loosening and tightening the respective bolt assemblies 22 to adjust the position of the different bracket members 18–20 relative to the stationery bracket 21 until the end of the jet pipe 8 rests in between the two centering tabs 28 and touches the rod 27 as further schematically shown in FIG. 3. This insures centering of the jet pipe 8 within the inlet opening 10 in one plane as well as insertion depth positioning of the jet pipe within the catalyst housing.

Following this the alignment aid tool 26 is removed from the one pair of keyway slots 31, 32 (depicted by the solid line showing of the tool 26 in FIGS. 3 and 4) and inserted through the other pair of keyway slots 33, 34 and rotated 180° as schematically shown in phantom lines in FIG. 4 while adjusting the position of the catalyst housing 4 by loosening and tightening the appropriate bolt assemblies 22 until the end of the jet pipe 8 once again rests in between the two centering tabs 28 to obtain alignment of the jet pipe in a second plane perpendicular to the first plane for concentrically locating the jet pipe within the inlet opening 10. Finally the tool 26 is removed from the second pair of keyway slots 33, 34, thus completing the installation.

If desired, a turbulence enhancing plate 40 (see FIGS. 1 and 2) may be mounted within the outer end of the jet pipe 8 for increasing the turbulence of the exhaust gases passing through the jet pipe into the housing 4 and thus the mixing of the exhaust gases with the ambient air entering the housing 4 through the annular gap 11 for better cooling and catalyst performance. The turbulence enhancing plate 40 is secured in place within the outlet end of the jet pipe 8 as by welding. In the outer end of the plate 40 is a slit 41 providing two end pieces 42, 43 that are bent in opposite directions for causing the desired turbulent flow of the exhaust gases passing through the jet pipe.

As will be apparent, the catalytic converter system 1 of the present invention can be installed on engines both by original equipment manufacturers and in the aftermarket.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. An oxidation catalytic converter system for small spark ignited engines comprising a housing containing a catalyst having an inlet and an outlet, a jet pipe extending into said inlet through which exhaust gases pass through said housing and out said outlet, an annular air gap between said inlet and said jet pipe through which ambient air is drawn into said housing by the exhaust gases entering said housing from said jet pipe, and means for mounting said housing directly to an engine chassis independently of the engine, whereby said housing is vibrationally isolated from the engine.

2. The system of claim 1 wherein said jet pipe is attached to the engine exhaust and extends into said inlet in noncontacting relation to said housing, whereby said housing is vibrationally isolated from said jet pipe.

3. The system of claim 2 further comprising elastic engine mounts for attaching the engine to said chassis.

4. The system of claim 2 wherein the engine exhaust includes a muffler portion having a discharge to which said jet pipe is attached.

5. The system of claim 3 further comprising adjustment means for establishing a depth of insertion of said jet pipe through said inlet into said housing.

6. The system of claim 2 further comprising adjustment means for establishing a concentricity of said jet pipe within said inlet.

7. The system of claim 2 further comprising adjustment means for establishing a depth of insertion of said jet pipe through said inlet into said housing and a concentricity of said jet pipe within said inlet.

8. The system of claim 1 further comprising means within said jet pipe for causing enhanced turbulence of the exhaust gases passing through said jet pipe into said housing for increased mixing of the exhaust gases with the ambient air within said housing for better cooling and catalyst performance.

9. The system of claim 8 wherein said means for causing enhanced turbulence comprises a plate mounted within said jet pipe, said plate having spaced apart end portions at one end bent in opposite directions to cause turbulent flow of the exhaust gases through said jet pipe.

10. An oxidation catalytic converter system for small spark ignited engines comprising a catalytic converter housing containing a catalyst, said housing having an inlet and an outlet, a jet pipe extending into said inlet for introducing exhaust gases from the engine into said catalytic converter, with an annular air gap between said jet pipe and said inlet through which ambient air is drawn by the flow of exhaust gases from said jet pipe into said catalytic converter and adjustment means for establishing a depth of insertion of said jet pipe through said inlet into said housing, said jet pipe extending through said inlet into said housing a predetermined depth to achieve a desired quantity of ambient air dilution for a given size and type of engine.

11. In combination, a small spark ignited engine mounted on an engine chassis, and an oxidation catalytic converter system for said engine, said system comprising a housing containing a catalyst, an inlet for receiving exhaust gases from said engine, an outlet for discharge of the exhaust gases from said housing after passing through said catalyst, jet pipe attached to the engine exhaust, said jet pipe extending into said inlet in noncontacting relation to said housing, and means for mounting said housing directly to said engine chassis independently of said engine, whereby said housing is vibrationally isolated from said engine.

12. The combination of claim 11 further comprising adjustment means for establishing a depth of insertion of said jet pipe through said inlet into said housing.

13. The combination of claim 12 further comprising adjustment means for establishing a concentricity of said jet pipe in said inlet.

14. A method of achieving an established insertion depth and concentricity of a jet pipe within an inlet to a catalytic converter housing comprising the steps of inserting an alignment aid tool through a first pair of keyhole shaped slots through diametrically opposite sides of the catalyst housing, the tool having a round rod that is received in a round opening of said slots and a pair of spaced apart centering tabs extending perpendicularly from the rod that are received in a radial slot portion of the slots extending at an angle away from the inlet, the centering tabs being spaced apart a distance slightly greater than the outside dimensions of the end of the jet pipe received within the inlet, the round opening of the slots having a forwardmost edge that is axially spaced from the inlet by a distance corresponding to the established insertion depth of the jet pipe, locating the centering tabs within the housing so that the centering tabs are equally spaced on opposite sides of the axial center of the housing, rotating the rod until the centering tabs face the inlet, and adjusting the position of the housing relative to the jet pipe until the end of the jet pipe touches the rod in between the centering tabs.

15. The method of claim 14 further comprising the steps of removing the tool from the first pair of keyhole shaped slots and inserting the tool through a second pair of keyhole shaped slots through diametrically opposite sides of the housing in the same transverse plane as the first pair of keyhole shaped slots but oriented 90° relative to the first pair of keyhole shaped slots, the second pair of keyhole shaped slots having a round opening for receiving the round rod of the tool and a radial slot portion extending at an angle away from the inlet for receiving the centering tabs, locating the centering tabs within the housing so that the centering tabs are equally spaced on opposite sides of the axial center of the housing, rotating the rod until the centering tabs face the inlet, adjusting the position of the housing relative to the jet pipe until the end of the jet pipe rests in between the centering tabs, securing the housing in place, and removing the tool from the second pair of keyhole shaped slots.

* * * * *